(12) United States Patent
Jeong et al.

(10) Patent No.: US 7,680,079 B2
(45) Date of Patent: Mar. 16, 2010

(54) METHOD OF SIGNALING QOS INFORMATION AT HAND-OVER BETWEEN ACCESS NETWORKS IN AN IP-BASED CORE NETWORK

(75) Inventors: Seong-ho Jeong, Seongnam-si (KR); Jong-ho Bang, Suwon-si (KR); Sung-hyuck Lee, Nam-gu (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 480 days.

(21) Appl. No.: 11/265,108

(22) Filed: Nov. 3, 2005

(65) Prior Publication Data

US 2006/0092879 A1 May 4, 2006

(30) Foreign Application Priority Data

Nov. 4, 2004 (KR) ............. 10-2004-0089418

(51) Int. Cl.
*H04W 4/00* (2009.01)
*H04W 36/00* (2009.01)
(52) U.S. Cl. .............. 370/331; 455/437; 455/440; 455/452.2; 370/310
(58) Field of Classification Search ......... 370/331–334; 455/436–444, 450–453
See application file for complete search history.

(56) References Cited

U.S. PATENT DOCUMENTS 6,353,616 B1 * 3/2002 Elwalid et al. .............. 370/443

| | | | |
|---|---|---|---|
| 6,631,122 B1 * | 10/2003 | Arunachalam et al. | 370/332 |
| 2003/0139186 A1 * | 7/2003 | Igarashi et al. | 455/438 |
| 2004/0095912 A1 * | 5/2004 | Gao et al. | 370/338 |
| 2004/0240414 A1 * | 12/2004 | Fan et al. | 370/332 |
| 2005/0163078 A1 * | 7/2005 | Oba et al. | 370/331 |

FOREIGN PATENT DOCUMENTS

JP 2003-070054 3/2003

OTHER PUBLICATIONS

Quality-of-Service Mechanisms in All-IP Wireless Access Networks, Bongkyo Moon et al., IEEE Journal On Selected Areas In Communications, vol. 22, No. 5, Jun. 2004.*
Japanese Office Action for corresponding Japanese Patent Application No. 2005-321636 dated Nov. 20, 2007.
Suda et al., "A Proposal of All-IP Mobile Network Architecture (2)", Networking Research Laboratories, NEC Corporation dated Nov. 20, 2007, 8 pgs (Abstract only in English).
Quality-of-Service Mechanisms in All-IP Wireless Access Networks, Bongkyo Moon, IEEE Journal on Selected Areas in Communications, vol. 22, No. 5, Jun. 2004, pp. 873-888 (in English).
Korean Office Action for corresponding Korean Patent Application No. 10-2004-0089418 dated Apr. 28, 2006.

* cited by examiner

*Primary Examiner*—Lester Kincaid
*Assistant Examiner*—Daniel Lai
(74) *Attorney, Agent, or Firm*—Staas & Halsey LLP

(57) ABSTRACT

A method of signaling quality of service information in response to a handover from a first access network to a second access network in an Internet Protocol (IP) based mobile network environment, the method comprising: transmitting a resource reservation message from a mobile node to the second access network; transmitting the resource reservation message to an IP-based core network from the second access network; and transmitting a resource reservation confirm message to the mobile node.

21 Claims, 8 Drawing Sheets

METHOD OF SIGNALING QOS INFORMATION AT HAND-OVER BETWEEN ACCESS NETWORKS IN AN IP-BASED CORE NETWORK

CROSS-REFERENCE TO RELATED APPLICATIONS

This application claims the benefit of Korean Patent Application No. 2004-0089418, filed on Nov. 4, 2004, in the Korean Intellectual Property Office, the disclosure of which is incorporated herein by reference.

BACKGROUND OF THE INVENTION

1. Field of the Invention

The present invention relates to a method of signaling quality of service (QoS) information at a handover between access networks in an IP-based core network, and, more particularly, to a method of signaling QoS information at a handover between access networks in an Internet Protocol (IP)-based core network.

2. Description of the Related Art

A certain amount of resources are reserved to stably provide the resources during a handover (H/O) to guarantee the quality of service of multimedia application during the handover of a mobile node (MN) in a mobile network. Generally, the QoS is affected by a type of the handover.

The type of the handover is classified according to a control signaling load between different entities. That is, the handover is classified as a handover within an identical access router (AR), a handover between access routers (ARs) and a handover between access networks (ANs).

Meanwhile, the signaling load may be differently generated according to the type of the handover in an access network. For example, additional signaling is required according to consideration of the signaling situation when the signaling is achieved based on the resource reservation protocol (RSVP). That is, if an access router is not changed during a handover, a wireless resource is only controlled, but if a previous access router (PAR) is changed to a new access router (NAR), signaling must be achieved to reserve resources on a new path. Also, if a mobility event such as a handover occurs, the QoS is not properly provided until re-reserving resources by transmission of a refresh message between a crossover node (CRN) and a NAR. The CRN is a node at which a previous path and a new path meet.

Therefore, when a mobile node is moved to another access router, the time required to reset a routing path, and the time required to reconfigure resource management, needs to be optimized. That is, resources on the new path should be rapidly reserved, and resources on the previous path should be instantly released.

A main node serving the instant resource reservation and release is the CRN at which the previous path and the new path are met. Therefore, it is very important to quickly find the CRN to rapidly reserve and release the resources. Also, if the CRN is used, the resource re-reservation is achieved only on the new path between the CRN and a NAR, without re-reserving resources in an end-to-end level. Accordingly, a comparatively short delay time is required.

As described above, the resource reservation should be achieved by considering a mobile event such as a handover of a mobile node between access networks in a mobile environment. However, a conventional RSVP cannot be used in the mobile network because the conventional RSVP is designed without considering the mobility event. For overcoming the shortcomings of the conventional RSVP, various solutions have been introduced, such as mobile RSVP (MRSVP), RSVP tunnel, concatenation and optimization for reservation path (CORP), and hierarchical mobile RSVP (H-MRSVP).

The MRSVP provides stable QoS service without delay during a handover of a mobile node. However, the MRSVP ineffectively uses resources in an access network having insufficient resources. According to the MRSVP, a mobile node must previously reserve resources of cells around the area where the mobile mode is transferred, and the reserved resources are not quickly released. Accordingly, the resources are doubly wasted. Furthermore, resources are unnecessarily reserved in an end-to-end level between a sender and a mobile node, or a sender and a proxy agent, because resources are not re-reserved by finding the CRN according to the MRSVP.

The RSVP tunnel provides stable QoS in a tunnel by solving a conventional problem in which a RSVP message is not detected between the end points of tunnel, that is, between a tunnel entry point and a tunnel exit point. However, the RSVP tunnel does not provide a method of rapidly re-reserving resources at a handover of a mobile node, and a method of localized path repair, by instantly finding a CRN. Also, the RSVP unnecessarily performs the resource re-reservation of an end-to-end level.

Meanwhile, the CORP provides a QoS by expanding a conventional RSVP path when a handover occurs. In order to expand the RSVP path, a concatenation for a reservation path is used. However, the CORP wastes resources in a mobile access network having insufficient resources since a terminal must previously reserve resources of cells around the area where the terminal is transferred, and an end-to-end RSVP session is opened without using a node such as a CRN.

The H-MRSVP is a resource reservation protocol unified with the RSVP and a regional registration of a mobile IP. That is, resources are reserved by using a reserve tunnel between a gateway mobility agent (GMA) and a new proxy agent (PA) when an inter-region handover occurs. However, the H-MRSVP has a problem of a lack of resource usability caused by a passive reservation, although the resources are previously reserved only when a handover delay time becomes longer, i.e., when the inter-region handover occurs.

SUMMARY OF THE INVENTION

Accordingly, the present general inventive concept has been made to solve the above-mentioned and/or other problems, and an aspect of the present general inventive concept is to provide a method of signaling QoS information reserving resources in a new access network by checking the availability of the resources when a handover is performed between access networks in an IP based mobile network environment.

Additional aspects and/or advantages of the invention will be set forth in part in the description which follows and, in part, will be apparent from the description, or may be learned by practice of the invention.

In accordance with an aspect of the present invention, there is provided a method of signaling QoS information in response to a handover occurring from a previous communicating access network to the adjacent target access network in an IP-based mobile network environment, the method including: transmitting a resource reservation message from a mobile node to an access router of the adjacent target access network; performing a first authentication by checking the mobile node's authority to use resources in the adjacent target access network; transmitting the resource reservation message to an IP-based core network from the access router of the adjacent target access network after the first authentication;

performing a second authentication by checking the mobile node's authority to use resources in the core network; and transmitting a resource reservation confirm message to the mobile node according to the result of the second authentication.

The resource reservation message transmitted from the mobile node to the adjacent target access network may include preemption information, and the resources in the adjacent target access network may be preempted for the mobile node according to the preemption information.

The resource reservation message transmitted from the access router of the adjacent target access network to the IP-based core network may include preemption information, and the resources in the core network may be preempted for the mobile node according to the preemption information.

The authority of the mobile node to use the resources in the adjacent target access network may be checked in the adjacent target access network by an access network quality broker (ANQB) that manages resources of low level (transport level) elements in the adjacent target access network, and the authority of the mobile node to use the resources in the adjacent access network may be authenticated by an access network policy entity (ANPE) that determines a policy regarding usage of the resources in the adjacent target access network.

The authority of the mobile node to use the resources in the core network may be checked in the core network by a core network quality broker (CNQB) that manages resources of low level elements in the core network, and the authority of the mobile node to use the resources in the core network may be authenticated by a core network polity entity (CNPE) that determines a policy regarding usage of the resources in the core network.

The method may further include performing a session binding update in an edge router accessing the previous communicating access network before the handover from the IP-based core network after the transmitting of the resource reservation confirm message to the mobile node according to the result of the second authentication; and initiating resource release at the edge router to release resources of the previous communicating access network before the handover.

The resource reservation message may further include a flag field representing a destination of the resource reservation message.

The flag field may be a crossover node (CRN) flag field indicating that the destination of the message is a CRN of the IP-based network, and the flag field may include one bit.

The method may further include the mobile node checking the availability of the resources in the adjacent target access network before transmitting the resource reservation message to an access router of the adjacent target access network.

The availability of the resources in the adjacent target access network may be checked through communication of access network quality brokers (ANQBs) of the previous communicating access network and the adjacent target access network which manage resources of low level elements in the access networks.

The checking of the availability of the resources in the adjacent target access network may comprise: transmitting, from the mobile node to the access router of the previous communicating access network, an event object message having mobility information and a request to check the availability of the resources in the target access network; transmitting a resource check message (Res_CHECK) to the access network quality broker (ANQB) in the previous access network from the access router of the previous communicating access network; transmitting a resource availability check request message (Res_CHECK_REQ) to an ANQB of the adjacent target access network from the ANQB in the previous communicating access network; and checking the availability of the resources in the adjacent target access network by the ANQB of the adjacent target access network.

The method may further include transmitting a resource availability check request message (Res_CHECK_REQ) to a core network quality broker (CNQB) in the IP-based network from the ANQB of the adjacent target access network after the checking of the availability of the resources in the adjacent target access network by the ANQB of the adjacent target access network; transmitting a resource response message (Res_Availability_REP) having information representing whether the resources in the core network are available according to the checking of the availability from the CNQB to the ANQB of the adjacent target access network; and transmitting the resource availability response message (Res_Availability_REP) to the ANQB of the previous communicating access network from the ANQB of the adjacent target access network.

The method may further include transmitting the response availability response message (Res_Availability_REP) to the access router of the previous communicating access network by the ANQB of the previous communicating access network in response to the ANQB of the previous communicating access network receiving the message; and transmitting a resource confirm message to the mobile node from the access router of the previous communicating access network.

According to another aspect of the present invention, there is provided a method of signaling quality of service information in response to a handover from a first access network to a second access network in an Internet Protocol (IP) based mobile network environment, the method including: transmitting a resource reservation message from a mobile node to the second access network; transmitting the resource reservation message to an IP-based core network from the second access network; and transmitting a resource reservation confirm message to the mobile node.

According to another aspect of the present invention, there is provided a method of signaling quality of service information in response to a handover from a first access network to a second access network in an Internet Protocol (IP) based mobile network environment, the method including: transmitting a resource reservation message from a mobile node to the second access network; and reserving resources of the second access network in response to receiving the resource reservation message.

The method may further comprise preempting the resources of the second access network for the mobile node in response to there being insufficient resources available in the second access network.

BRIEF DESCRIPTION OF THE DRAWINGS

These and/or other aspects and advantages of the invention will be apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

In the following description, drawing reference numerals may be repeated to describe repeated elements in different drawings. Some matters may be defined in the description along with a detailed construction, however, these elements are merely provided to assist in a comprehensive understanding of the invention. Thus, it is apparent that the present invention may be carried out without those particularly described elements. Also, well-known functions or constructions may not be described in detail, so as to not obscure the invention in unnecessary detail.

Resources are wasted in a conventional resource reservation method because the resources are previously reserved in the conventional resource reservation method. In order to effectively prevent the wasteful use of resources, a method of signaling QoS information at a handover between access networks in an IP-based mobile network is provided. In the method of signaling QoS information of the present invention, resources are reserved by checking the availability of the resources in a target access network during a handover to prevent wasteful use of the resource.

Before describing the present invention, an IP-based mobile network in which an embodiment of the present invention may be applied will be explained with reference to FIGS. 1 and 2.

Figure 1:
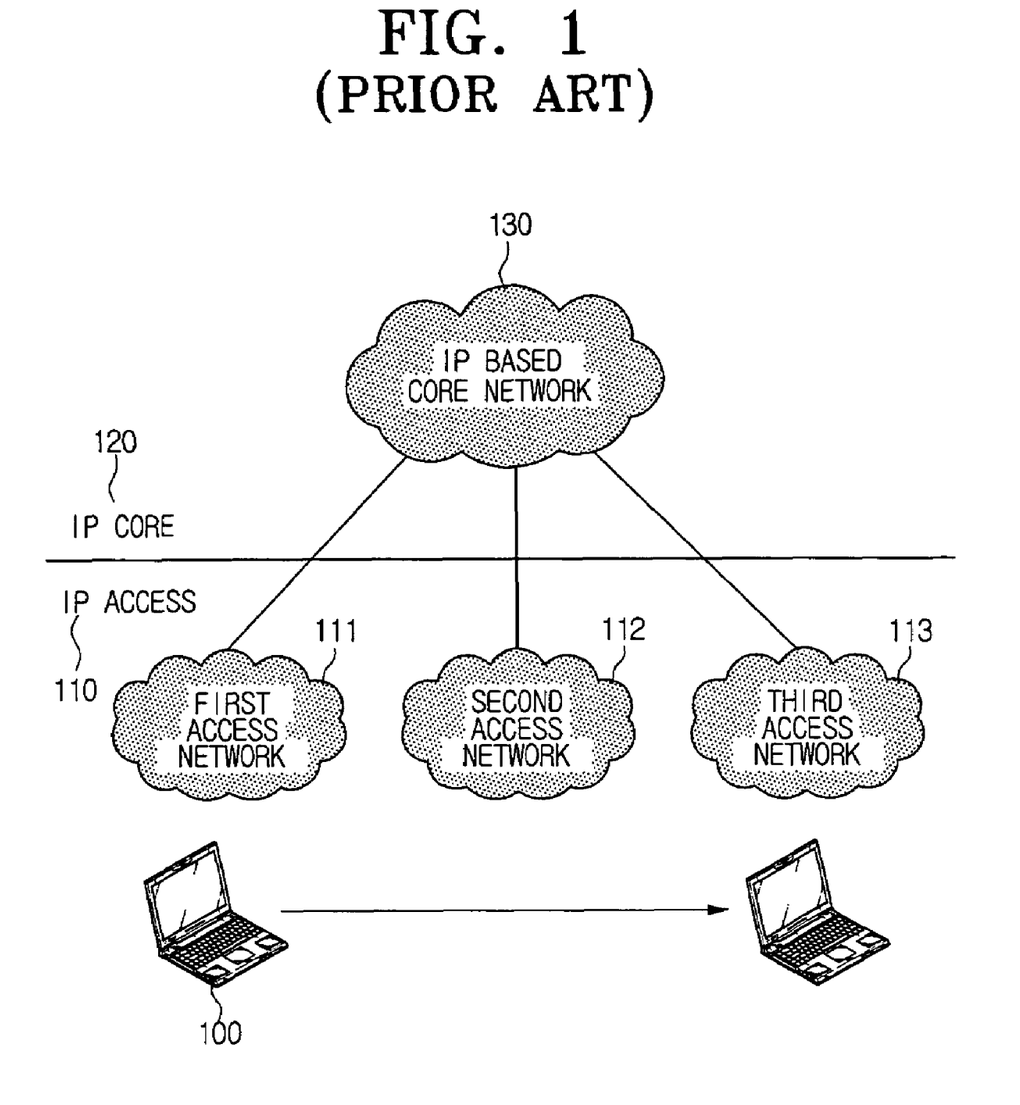
FIG. 1 is a view illustrating a structure of an IP based mobile network.

FIG. 1 is a view illustrating a structure of an IP based mobile network.

Referring to FIG. 1, the IP-based mobile network is divided into an IP access region 110 in which terminals communicate with each other directly, and an IP core region 120 managing and controlling resources of the IP access regions 110. The IP access region 110 includes a plurality of access nodes (AN) 111, 112, and 113. Each AN directly communicates with at least one or more mobile nodes 100 such as computer terminals. The IP core region 120 denotes an IP-based core network 130, and manages communication between the ANs 111, 112, and 113, and allocation of resources.

Meanwhile, the present invention is applied in response to a handover occurring between access nodes occurs because the mobile node communicating to an access node moves to an area covered by another access node. In FIG. 1, when a handover occurs by moving a mobile node 100 communicating to an AN 111 to an area covered by an AN 113, the present invention is applied to the IP based mobile network. When the handover occurs, the mobile node 100 releases the resources of the AN 111, and resources are allocated from the AN3 113.

Figure 2:
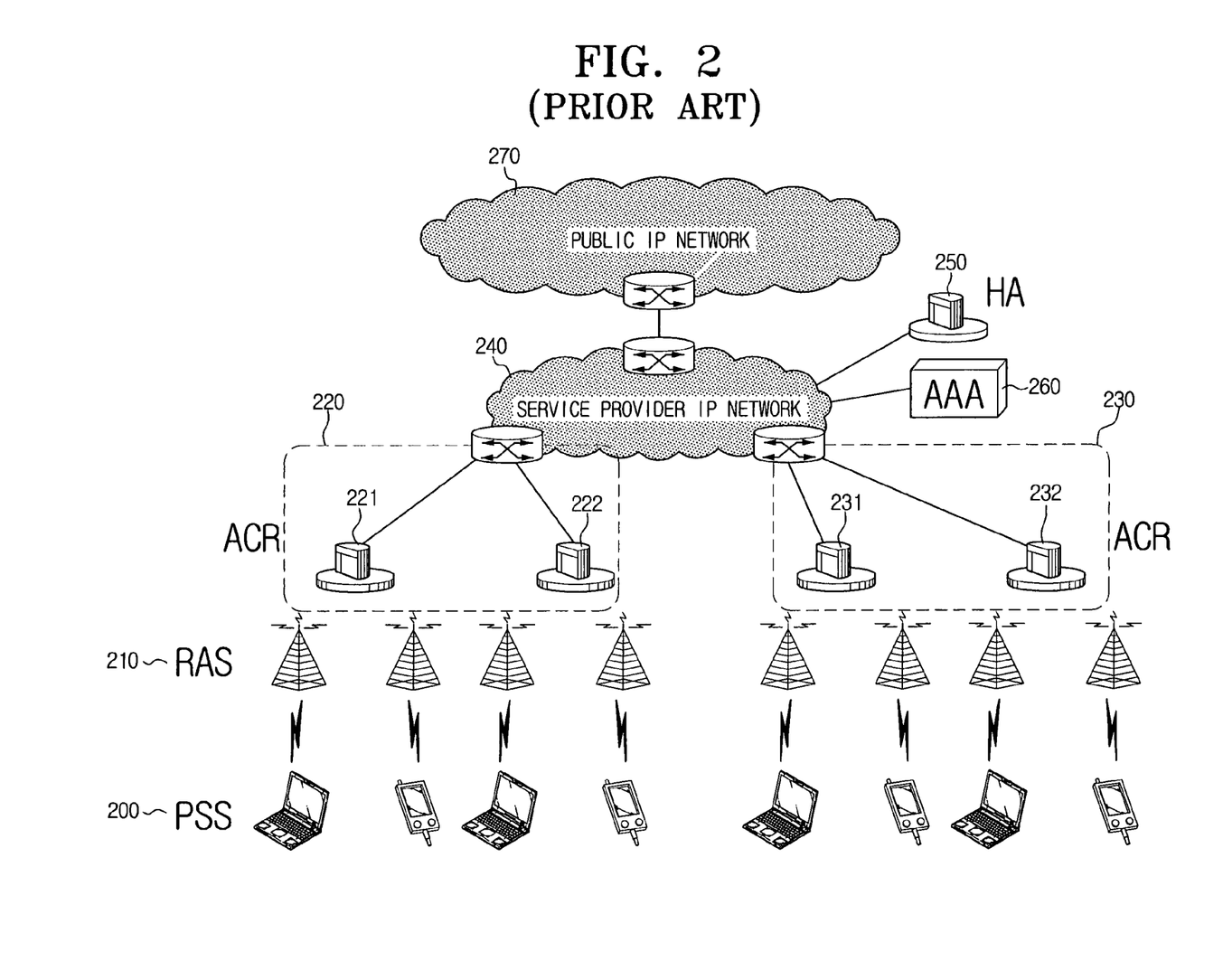
FIG. 2 is a detailed view illustrating a structure of an IP based mobile network of FIG. 1.

FIG. 2 is a detailed view illustrating a structure of the IP based mobile network of FIG. 1.

Referring to FIG. 2, a mobile node 200 is a portable subscriber station (PSS). The mobile node 200 may be any type of a terminal capable of wireless communication to a radio access station (RAS) 210. For example, the terminal capable of wireless communication may include a notebook, a personal digital assistant (PDA), a handheld phone, a smart phone, and the like.

The mobile node 200 may be connected to a service provider IP network 240 through the radio access station 210 and an access control router (ACR) 221, 222, 231, or 232. The service provider IP network 240 includes a home agent (HA) 250 to manage mobile nodes 200 belonging to the IP network 240 and an authentication, authorization, and accounting (AAA) server 260. The HA 250 manages the mobility of each mobile node 200. The AAA server 260 performs functions for authenticating a user's authorization and accounting. The service provider IP network 240 may be connected to a public IP network 270 through a predetermined gateway.

Each of the access control routers 221, 222, 231, and 232 manages at least one or more radio access stations 210. Also, at least one of the access control routers 221, 222, 231, and 232 forms an IP based access network (AN) 220 or 230. For example, a first access control router 221 and a second access control router 222 form the first AN 220, and a third access control router 231 and a fourth access control router 232 form the second AN 230.

The present invention is applied in response to the mobile node 200 performing a handover between the ANs. That is, the mobile node 200 releases a connection to the first AN 220, and resources are allocated to the mobile node 200 from the second AN 230 according to an embodiment of the present invention in response to the mobile node 200 performing a handover from the first AN 220 to the second AN 230.

Hereinafter, a method of signaling QoS information at a handover in an IP based mobile network according to an embodiment of the present invention will be explained with reference to FIGS. 3 to 5.

Figure 3:
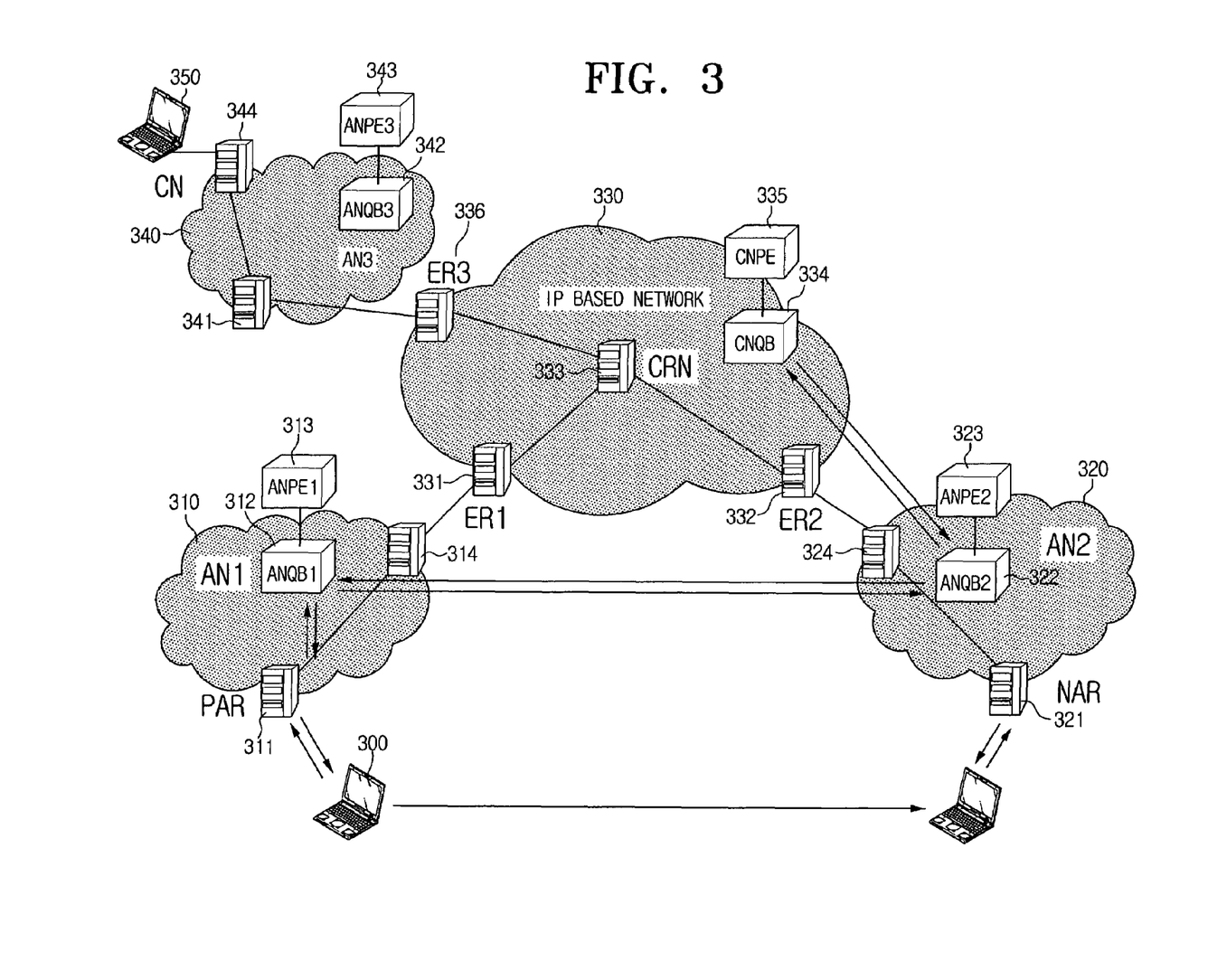
FIG. 3 is a view illustrating a handover between access networks in an IP-based mobile network according to an embodiment of the present invention.

FIG. 3 is a view illustrating a handover between access networks in an IP based mobile network according to an embodiment of the present invention.

Referring to FIG. 3, a mobile node 300 performs a handover in response to the mobile node 300 moving from a first access network AN1 310 to a second access network AN2 320. In this case, the resource availability of the AN2 320 is instantly determined to reliably signal QoS information according to the present embodiment. Also, the signaling with the AN2 320 is performed to firstly allocate the resources of the AN2 320.

In order to implement the embodiment of the present invention, an access network QoS broker (ANQB), a core network QoS broker (CNQB), an access network policy entity (ANPE), and a core network policy entity (CNPE) are used to manage resources and policy. That is, network resources are safely managed by applying an authentication procedure to an access network and a core network based on the ANQB, CNQB, ANPE, and CNPE.

Meanwhile, the ANQB, CNQB, ANPE, and CNPE are functional blocks used to describe the present invention, and it is obvious to those skilled in the art that these functional blocks may be substituted with other function blocks performing identical functions.

Before describing a signaling procedure according to the present embodiment, a system shown in FIG. 3 will be briefly explained.

Referring to FIG. 3, if a handover occurs in response to a mobile node 300 moving from a first access node (AN1) 310 to a second access node (AN2) 320 after communicating with the AN1 310 through a previous access router (PAN) 311, the mobile node 300 communicates with the AN2 320 through a new access router (NAR) 321.

Meanwhile, the AN1 310 possesses the PAR 311 for communicating with the mobile node 300 through a wireless interface. Additionally, the AN1 310 includes an ANQB1 312 and an ANPE1 313 to manage resources and guarantee the requested QoS for the mobile node 300 belonging to the AN1 310. The AN1 310 further includes a first access network gateway (ANG1) 314 connected to the IP based network 330.

The AN2 320 includes the NAR 321 for communicating with the mobile node 300 through a wireless interface. Additionally, the AN2 320 includes an ANQB2 322 and an ANPE2 323 to manage resources and guarantee the requested QoS for mobile nodes belonging to the AN2 320. The AN2 320 further includes a second access network gateway (ANG2) 324 connected to the IP based network 330.

The IP based network 330 is connected to each of ANs 310, 320, and 340. The IP based network 330 transmits and receives data to/from the ANs 310, 320, 340 through an edge router (ER). That is, the IP-based network 330 communicates with the AN1 310 through a first edge router (ER1) 331, and communicates with the AN2 320 through a second edge router (ER2) 332. The IP-based network 330 communicates with the AN3 340 through a third edge router (ER3) 336. The IP based network also includes a CNQB 334 and a CNPE 335 for managing resources and guaranteeing a QoS of ANs connected to the IP based network 330.

As shown in FIG. 3, the mobile node 300 is connected to the AN1 310, and communicates with a correspondent node (CN) 350 connected to the AN3 340 through the IP based network 330. The AN3 340 also includes an ANQB3 342 and an ANPE3 343, and is connected to the CN 350 through a third access router (AR3) 344.

Each of the ANQBs manages quality of low level elements linked to the corresponding network. That is, the ANQBs perform QoS management and the ANQBs may be considered as local quality agents or local bandwidth brokers. Each of the ANPEs determines a policy of low level elements linked to the corresponding network, and may be considered as a local policy server.

As described above, the access network QoS broker (ANQB), the core network QoS broker (CNQB), the access network policy entity (ANPE), and the core network policy entity (CNPE) are used to manage the resources and guarantee the QoS. That is, network resources are safely managed by applying an authentication procedure to an access network and a core network based on the ANQB, the CNQB, the ANPE, and the CNPE.

Furthermore, in the present embodiment, a conventional candidate access router discovery/context transfer protocol selecting one among a plurality of ANs is not used, and a resource reservation is determined by exchanging QoS resource information between ANQBs of the ANs in order to prevent shortage of resources at a handover. That is, in order to determine the availability of resources, the QoS resource information is exchanged between QoS brokers (QB) such as the ANQB and CNQB, which perform resource management and permission control of each network.

For example, when a mobile node 300 performs a handover from the AN1 310 to the AN2 320 as shown in FIG. 3, the availability of resources in the AN2 320 is determined by checking the ANQB2 322 through the ANQB1 312, and the availability of resources between the CRN 333 and the AN2 320 by checking the CNQB 334 through the ANQB2 322.

As described above, the availability of resources is determined before performing a handover in the present embodiment. If resources of an access node such as the AN2 320 are insufficient at the handover, the mobile node 300 performs preemption by using a Session_Pri Object message proposed by the present embodiment in response to the mobile node 300 accessing the new access network, i.e., AN2 320, in order to smoothly use resources after the mobile node 300 performs the handover. That is, the Session_Pri Object message in a signaling message is newly defined to firstly allocate resources to a mobile node 300 performing the handover rather than to a newly generated session flow. It is preferable, though not necessary, that a policy entity such as the ANPE or the CNPE authenticates an authorization of the mobile node 300 during the preemption.

In the present embodiment, a bandwidth pipe (BW) is controlled by newly defining and reporting a Session Binding Update (BU) object to a domain edge router (ER) or an aggregator to prevent collapse of a session by binding the handover of the mobile node 300. That is, duplication of resource reservation is prevented, and a wasteful use of resources is reduced, through a new Session Binding Update to increase the usability of the network resources.

Additionally, a delay caused by resetting the resources is eliminated by using a CRN flag in the signaling message, i.e., Session_Pri object, in order to prevent releasing previously setting resources at an unchanged path through the session binding update. That is, the CRN flag is newly defined and used so that the CRN 333 is a final destination of the corresponding signaling message.

For example, if the mobile node 300 performs a handover as shown in FIG. 3, a preemption of resources is achieved through the AN2 320 to guarantee a QoS of the mobile node 300 according to the present embodiment. That is, if the preemption of the resources is requested by the mobile node 300 by transmitting a Session_Pri object message to the NAR 321, the AN2 320 determines a policy of the mobile node 300 by checking the ANQB2 322 and the ANPE2 323, and allocates the resources to the mobile node 300 rather than another newly generated session flow.

Also, since the mobile node 300 communicates to the CN 350 through the CRN 333 of the IP based network 330 during the handover of the mobile node 300, preemption of resources between the IP-based network 330 and the AN2 320 must be achieved. Accordingly, the AN2 320 checks policy information of the mobile node 300 through the CNQB 334 and the CNPE 335 of the IP based network 330 after checking policy information of itself for the mobile node 300, and determines resource allocation between the IP based network 330 and the AN2 320 for the mobile node 300.

If the preemption of the resources is settled as described above, the CRN 333 performs a session binding update with the AN1 310 to release (teardown) resources allocated to the AN1 310 for the mobile node 300.

Hereinafter, the above described method of checking the availability of resources and preempting the resources will be explained in more detail with reference to FIGS. 4 and 5.

Figure 4:
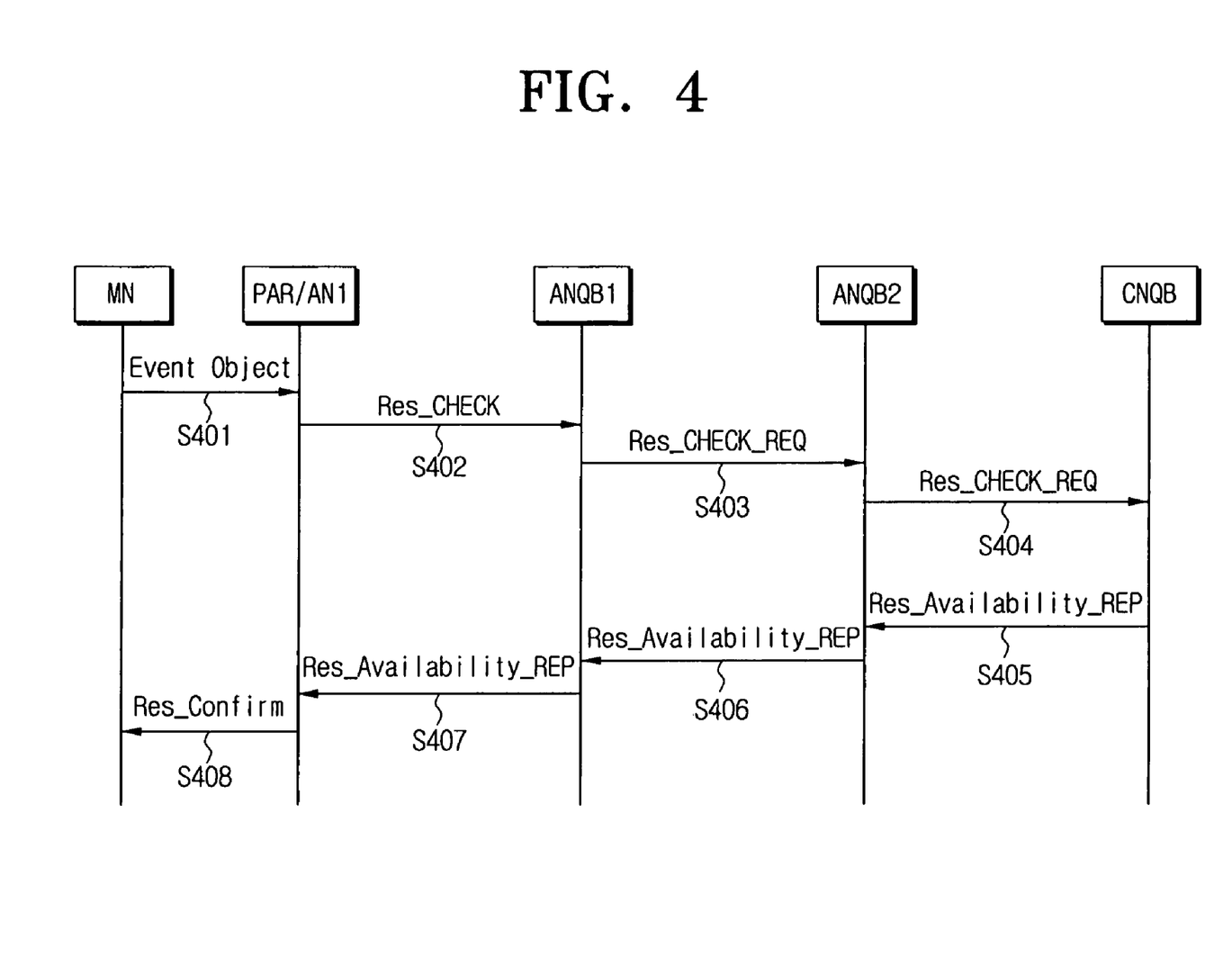
FIG. 4 is a flowchart illustrating a method of checking the availability of resources at a handover according to an embodiment of the present invention.

FIG. 4 is a flowchart illustrating a method of checking the availability of resources at a handover by exchanging QoS information between ANQBs according to an embodiment of the present invention.

Referring to FIG. 4, when the mobile node (MN) performs a handover from the AN1 to the AN2, the availability of resources in the AN2 is determined.

At first, the mobile node 300 records a request of a resource availability check in an event object message (Event Object) and transmits the event object message to the PAR 311 of the AN1 where the mobile node is recently accessed at operation S401. When the PAR 311 receives the event object message, the PAR 311 transmits a resource check message (Res_CHECK) to the ANQB1, which is an ANQB of the PAR 311, to request a check of the resource availability of another access network at operation S402.

Since the mobile node 300 performs the handover from the AN1 to the AN2, the resource availability of the AN2 must be checked. Accordingly, the ANQB1 312 transmits a resource availability check request message (Res_CHECK_REQ) to the ANQB2 322 of the AN2 at operation S403. When the ANQB2 receives the resource availability check request message from the ANQB1 312, the ANQB2 322 checks the resource availability of the AN2. Since resources between the AN2 and the IP-based network 330 must be obtained, the ANQB2 322 transmits a resource availability check request message (Res_CHECK_REQ) to the CNQB 334 of the IP based network 330 at operation S404.

The CNQB 334 transmits a resource availability response message (Res_Availability_REP), including information about the resource availability according to the result of the resource availability check request, to the ANQB2 322 at operation S405. When the ANQB2 322 receives the resource availability response message, the ANQB2 322 feeds back the resource availability response message to the ANQB1 312 at operation S406. The ANQB1 312 transmits the resource availability response message (Res_Availability_REP) to the PAR 311 at operation S407. Finally, the PAR 311 transmits a resource confirmation message (Res_Confirm) to the mobile node (MN) 300 requesting the resource availability check at operation S408.

Figure 5:
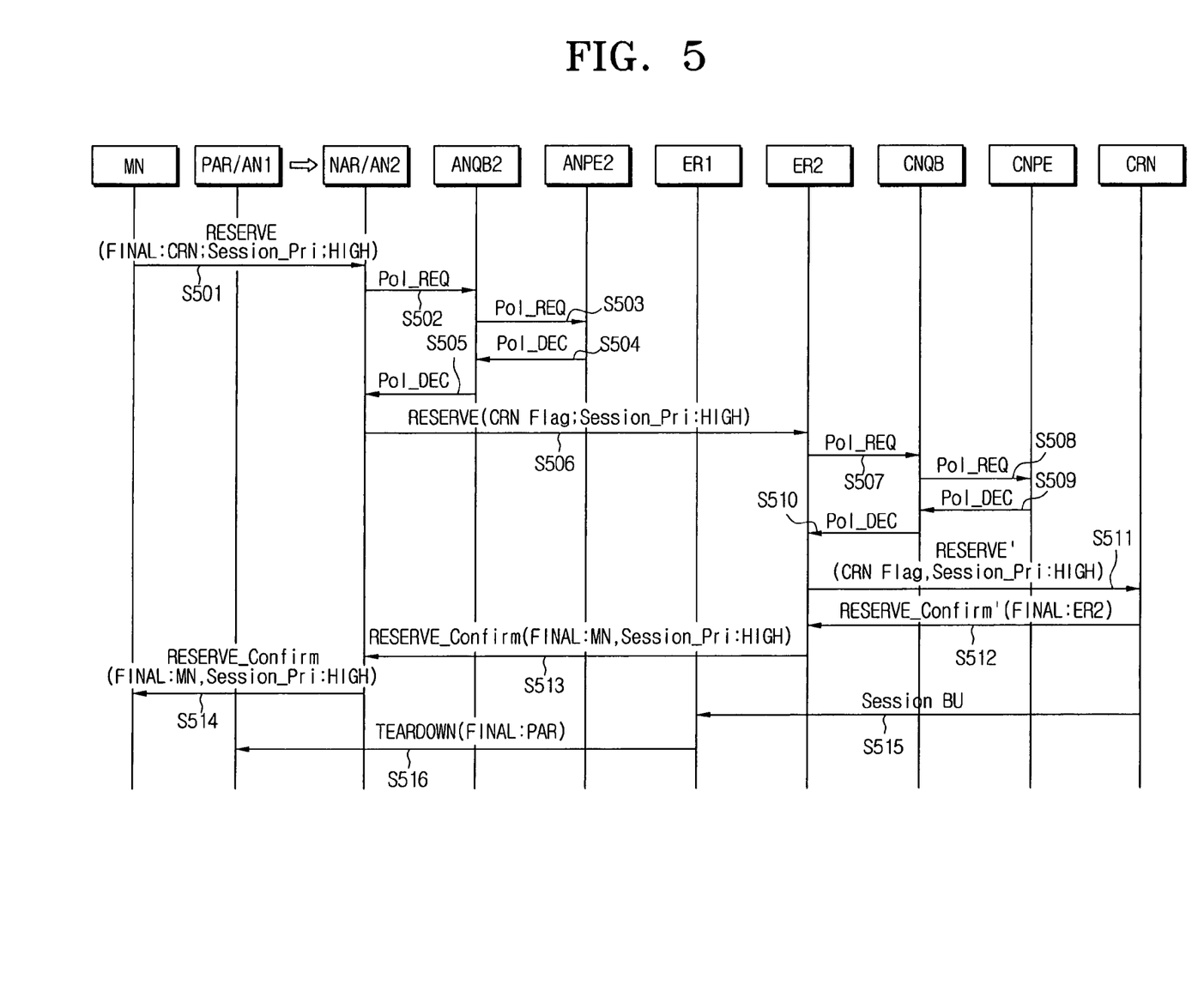
FIG. 5 is a flowchart illustrating a method of reserving resources by accessing another access network according to an embodiment of the present invention.

FIG. 5 is a flowchart illustrating a method of reserving resources by accessing another access network according to an embodiment of the present invention.

Referring to FIG. 5, when a mobile node (MN) 300 performs a handover from an AN1 to an AN2, a QoS for the mobile node 300 is guaranteed by requesting a preemption of resources from the AN2 after checking the resource availability of the AN2 as described above with reference to FIG. 4.

At first, the mobile node (MN) 300 transmits a resource reservation message (RESERVE(FINAL:CRN:Session_Pir: HIGH)) to an NAR 321 of the AN2 by using the obtained resource availability information at operation S501. In order to preempt the resources of the mobile node according to the present embodiment, the resource reservation message is transmitted by adding the Session_Pri object in the resource reservation message. The message is transmitted by recording the Session_Pri object as HIGH in order to firstly allocate resources to the mobile node 300 rather than newly generating resource reservations, even though although resources to be allocated to the AN2 may be insufficient according to the result of the resource availability check. That is, the Session_Pri object is set in the signaling message (resource reservation message) according to the present embodiment for a session flow of the mobile node performing the handover to firstly use resources rather than a newly generated session flow. The significance and operation of the Session_Pri object being set as HIGH will be discussed later in this description.

Furthermore, in the present embodiment, a CRN flag is used in the signaling message to not pre-set resources so as to eliminate a delay caused by resetting the resources. Accordingly, if a final destination (FINAL) CRN field of the resource reservation message is set as 1, the resource reservation is effectively achieved by transmitting the resource reservation message to the CRN.

Meanwhile, when the NAR 321 receives the resource reservation message, the NAR 321 determines whether the mobile node 300 has an authority to reserve the resources by checking an authority of the mobile node 300 to reserve the resources through the ANQB 322 and the ANPE 323 of the NAR 321. That is, the NAR 321 transmits the policy request message (Pol_REQ) to the ANQB2 322 at operation S503 to authenticate the mobile node. When the ANPE2 323 receives the policy request message, the ANPE2 323 authenticates the authority of the mobile node 300 to use the resources by checking a database of the ANPE2 323, and the ANPE2 323 transmits authentication information through the policy decision message (Pol_DEC) to the ANQB2 322 at operation S504. When the ANQB2 receives the policy decision message, the ANQB2 322 transmits the policy decision message (Pol_DEC) to the NAR 321 at operation S505.

After the AN2 completes the authenticating procedure of the authority of the mobile node 300 to use the resources through the policy request message, the NAR 321 continuously transmits a resource reservation message to adjacent nodes to perform a resource reservation for the mobile node 300, and the message is finally transmitted to the ER2 332, which is a router connected to the IP based network 330 at operation S506.

That is, the ER2 332 receives the resource reservation message (RESERVE(CRN Flag:Session_Pri:HIGH)) from the NAR 321 and transmits the policy request message (Pol_REQ) to the CNQB 334 to authenticate the authority of the mobile node 300 to use the resources at operation S507. When the CNQB 334 receives the policy request message, the CNQB 334 requests authentication from the CNPE 335 by transmitting the policy request message (Pol_REQ) to the CNPE 335 at operation S508. After then, the CNPE 335 transmits the policy decision message (Pol_DEC) to the CNQB 334 by adding the authenticating information at operation S509. The CNQB 334 transmits the received policy decision message (Pol_DEC) to the ER2 332 at operation S510.

When the authentication procedure is completed as described above, the ER2 332 transmits the resource reservation request message (RESERVE(CRN Flage: Session_Pri: HIGI)) until the resource reservation request message reaches the CRN 333 at operation S511. Since the CRN flag is set and added in the resource reservation request message, the resource reservation request message can reach the CRN 333.

Accordingly, if the CRN 333 does not transfer the resource reservation request message any more by confirming that it is the CRN 333, the CRN 333 transmits a resource reservation confirm message (RESERVE_Confirm'(FINANL:ER2)) to the mobile node 300. That is, the resource reservation confirm message (RESERVE_Confirm'(FINANL:ER2)) is transmitted to the ER2 332 at operation S512, and then the ER2 332 transmits the resource reservation confirm message (RESERVE_Confirm'(FINANL:ER2)) to the NAR 321 of the AN2 at operation S513. Finally, the NAR 321 transmits the resource reservation confirm message (RESERVE_Confirm' (FINANL:ER2)) to the corresponding mobile node 300.

Meanwhile, since session binding information of the ER1 331 should be changed in response to a handover being performed as described above, the CRN 333 transmits a session binding update message (Session BU) to the ER1 331 at operation S515. The ER1 transmits a resource release message (TEARDOWN) to the PAR 311 of the AN1 to release resources of the previous path at operation S516.

Heretofore, the method of checking the resource availability at a handover of a mobile node and preempting the resources according to the present embodiment was explained. Hereinafter, the format of a message which is newly defined and transmitted by performing the above described operations according to the present embodiment will be explained with reference to FIGS. 6 to 9.

At first, a session binding update message will be explained with reference to the FIGS. 6 and 7.

Figure 6:
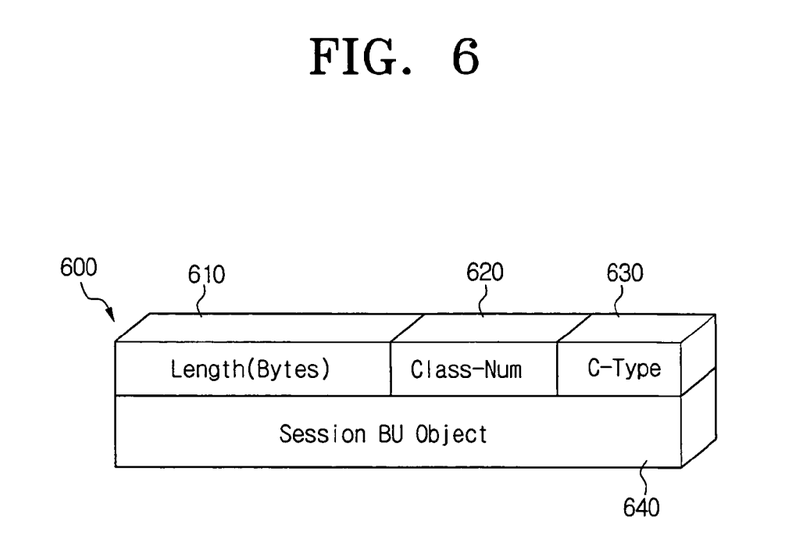
FIG. 6 illustrates a format of a session binding update message at a handover of a mobile node according to an embodiment of the present invention.

FIG. 6 illustrates the format of a session binding update message according to an embodiment of the present invention.

Referring to FIG. 6, the session binding update message 600 includes a field 610 representing a length of the message 600, a field 620 denoting a class number (Class-Num) of the message 600, a field 630 representing C-type information of the message 600, and a session binding update object field 640.

Figure 7:
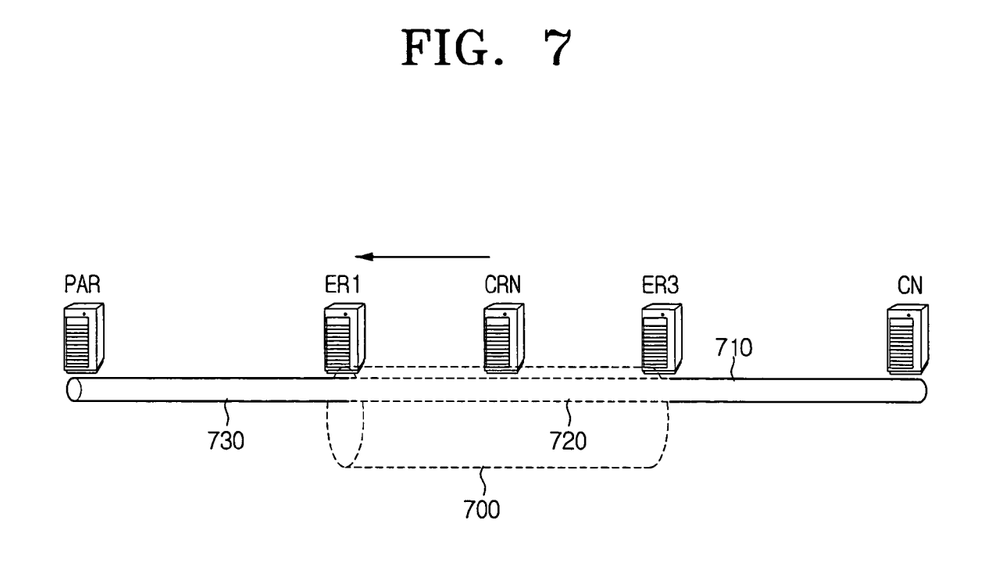
FIG. 7 illustrates a binding updated session between devices according to an embodiment of the present invention.

Referring to FIG. 7, the session binding update is performed by using the session binding update message 600 shown in FIG. 6 when there is a session binding update between CNs required at a PAR. That is, since a mobile node communicates through the PAR and the CN before performing a handover, end-to-end sessions 710, 720, 730 are set between the PAR and CNs. Also, since there may be other sessions existing between the ER1 and the ER3 beside the session 720 for the mobile node, a plurality of sessions may be set as an aggregate session 700.

If the session binding update between the PAR and the CNs is achieved by the session binding update message shown in FIG. 6, the old aggregate session 700 is maintained, and the end-to-end sessions 710, 720, and 730 between the PAR and the CNs are released.

Hereinafter, the format of the resource reservation message (RESERVE(FINAL:CRN:Session_Pri:HIGI)) including a Session_Pri object according to an embodiment will be explained with reference to the FIGS. 8 and 9.

Figure 8:
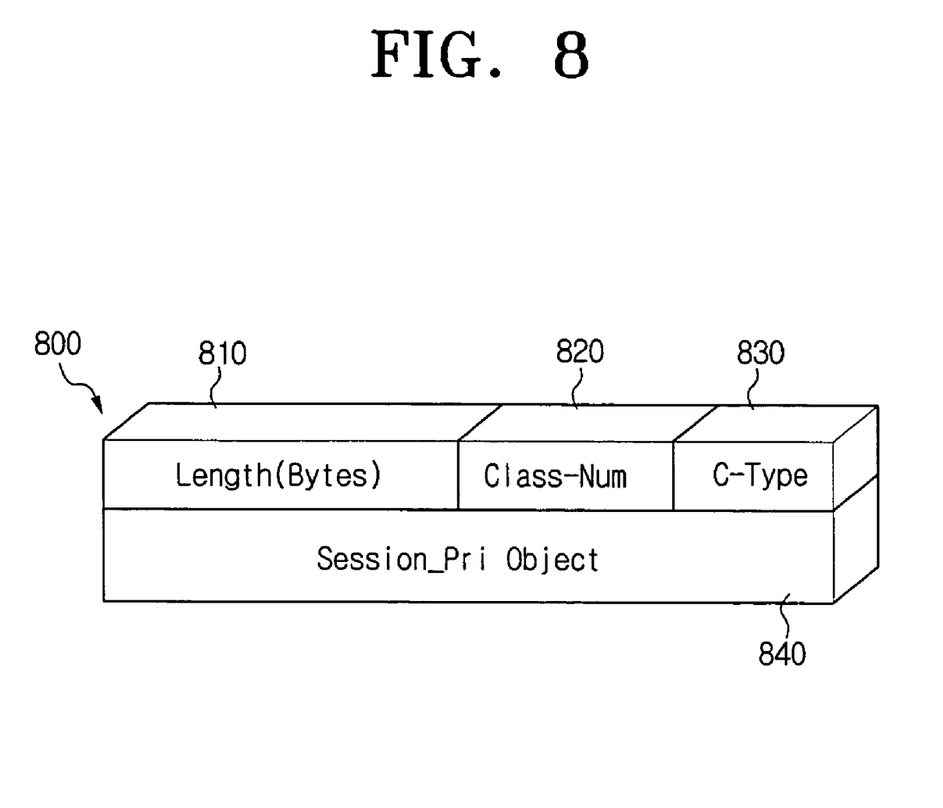
FIG. 8 illustrates a format of a resources reservation message according to an embodiment of the present invention.

FIG. 8 illustrates the format of a resources reservation message according to an embodiment of the present invention.

Referring to FIG. 8, when a mobile node preempts resources at a handover according to the present embodiment, a resource reservation message 800 is transmitted. The resource reservation message 800 includes a field 810 representing a length of the message 800, a field 820 denoting a class number (Class-Num) of the message 800, a field 830 representing C-type information of the message, and a Session_Pri object field 840.

As described above, if the Session_Pri object field 840 of the resource reservation message is set as HIGH, resource preemption for the mobile node transmitting the message is guaranteed after an authentication procedure.

Figure 9:
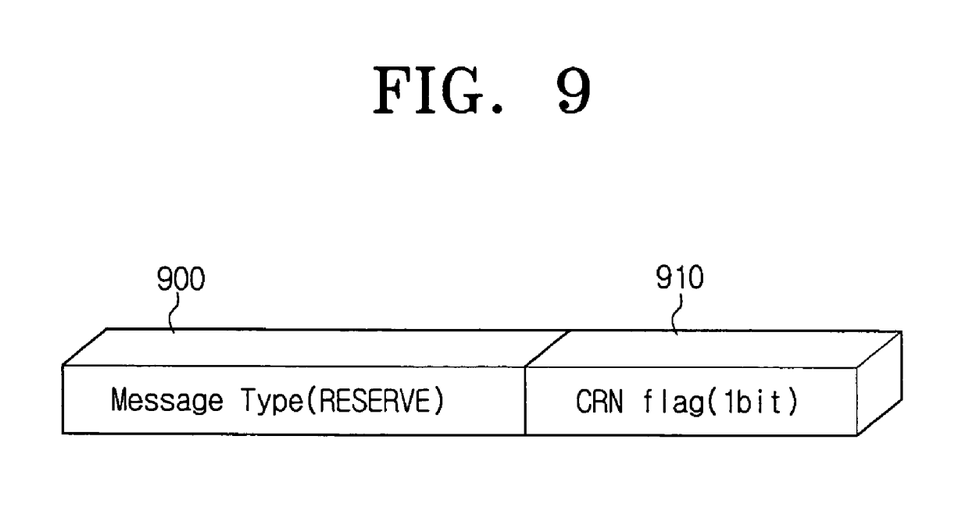
FIG. 9 illustrates a header format of a resource reservation message according to an embodiment of the present invention.

FIG. 9 illustrates the header format of a resource reservation message according to an embodiment of the present invention.

Referring to FIG. 9, the header of the resource reservation message includes a field (RESERVE) 900 and a CRN flag field 910. If the CRN flag is set as 1, the resource reservation message is transmitted to the CRN. Also, when the CRN receives the resource reservation message, the CRN recognizes that the destination of the message is the CRN itself by checking the CRN field. Since the CRN flag field only needs to represent whether the message is transmitted, it is preferable, though not necessary, that the CRN field is constructed with one bit.

Heretofore, the system, the method of transmitting the message, and the format of the message according to the present embodiment was explained. Meanwhile, the embodiments of the present invention can be applied to the IP-based mobile network environment as described above, and also can be applied to an IP technology harmonized conventional third generation mobile communication network.

Figure 10:
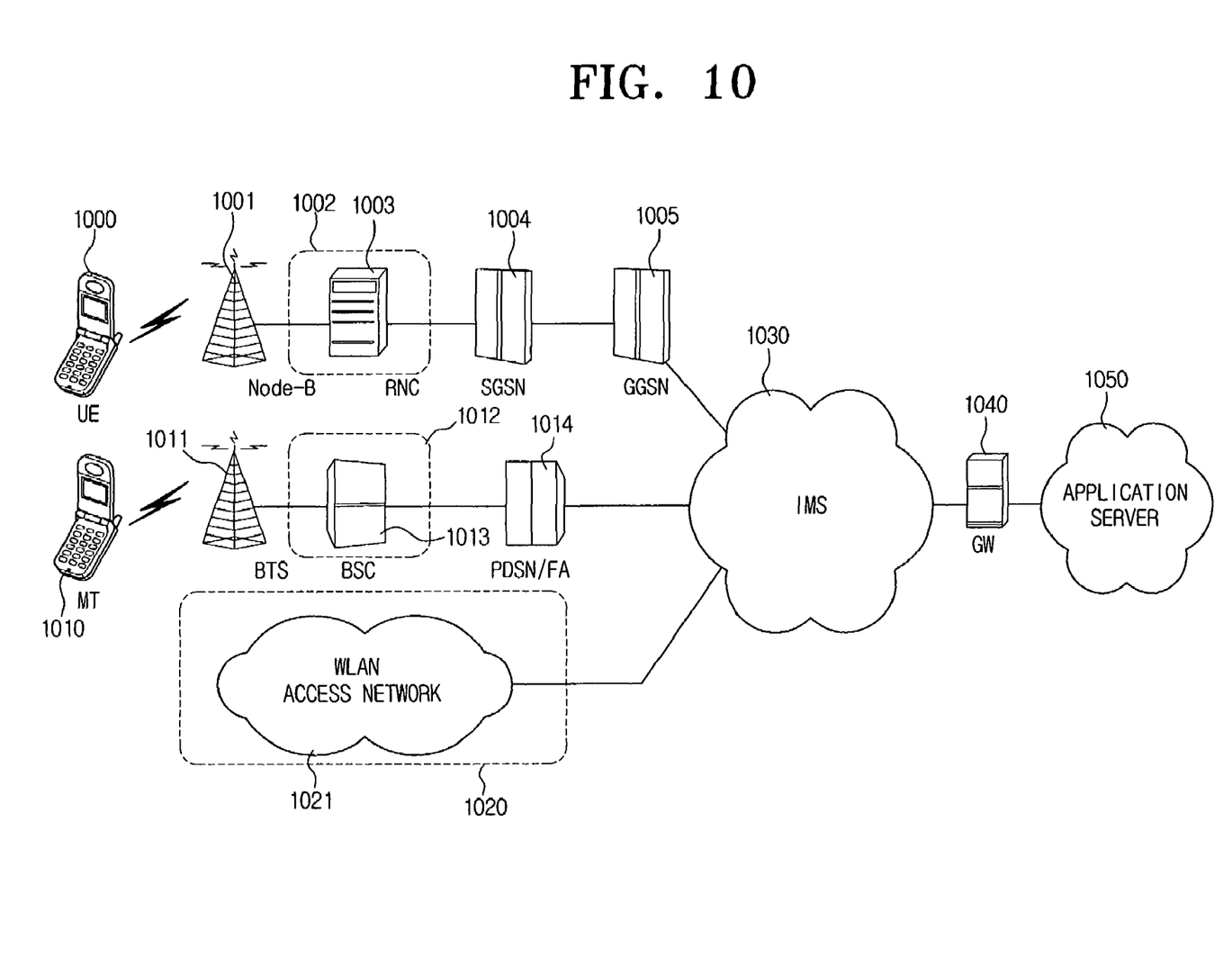
FIG. 10 is a view illustrating a structure of a system in which an embodiment of the present invention is applied to a third generation mobile network.

FIG. 10 is a view illustrating the structure of a system in which the present invention is applied to a third generation mobile network.

Referring to FIG. 10, in an asynchronous $3^{rd}$ generation partnership project (3GPP) based network, packet data is transmitted from a mobile node (user equipment: UE) 1000 to a serving general packet radio service (SGSN) support node 1004, constructing a core network through a base station (Node-B) 1001 and a base station controller (Radio Network Controller: RNC) 1002. Also, the packet data may be transmitted to an external network such as anIP CN multimedia session domain (IMS) 1030 through a gateway GPRS support node (GGSN).

Meanwhile, in a synchronous $3^{rd}$ generation partnership project 2 (3GPP2) based network, packet data transmitted from a mobile terminal (MT) 1010 is transmitted to a packet data switching node/foreign agent (PDSN/FA) 1014, constructing a core network through a base transceiver system (BTS) 1011 and a base station controller (BSC) 1012. Also, the data packet may be transmitted to an external network such as the IMS 1030 through the PDSN/FA 1014.

Furthermore, it is possible to communicate with the IMS 1030 through a wireless local area network (WLAN) 1021. Meanwhile, the IMS 1030 can communicate with various application servers 1050 through a predetermined gateway (GW) 1040.

The RNC 1003 of 3GPP, the BSC 1013 of 3GPP2, and the WLAN 1021 may be IP-based wireless access networks 1002, 1012 and 1920 according to the present invention. Accordingly, the present embodiments can be identically applied to them when the mobile terminals 1000, 1010 perform a handover between the access networks 1002, 1012, and 1020.

As described above, resources are wasted by previously reserving the resources according to the conventional method of reserving the resources. However, in the present invention, the resources are reserved after checking the availability of the resources in a new access network (AN) in response to a handover between the access nodes occurring. Therefore, the wasteful use of the resources is effectively prevented according to the present invention.

Furthermore, the resources are optimally managed and used in a domain, and a mobile node user receiving a multimedia service firstly receives a reservation of resource allocation at the handover in the present invention. Therefore, the multimedia service is stable provided to the user in a stable manner according to the present embodiment.

Conventionally, complicated procedures are performed to check the availability of resources of another access network which is a target network of a handover. However, in the present invention, the availability of the resources is checked in a relatively simple manner by exchanging QoS resource information between QoS brokers (QB) performing resource management and authority control of each network.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of signaling quality of service (QoS) information in response to a handover occurring from a previous communicating access network to an adjacent target access network in an Internet Protocol (IP) based mobile network environment, the method comprising:

checking an availability of the resources in the adjacent target access network, at a mobile node;

transmitting a resource reservation message from the mobile node to an access router of the adjacent target access network;

performing a first authentication by checking the mobile node's authority to use the resources in the adjacent target access network;

transmitting the resource reservation message to an IP-based core network from the access router of the adjacent target access network after the first authentication;

performing a second authentication by checking the mobile node's authority to use resources in the core network, the first authentication and the second authentication being performed prior to a handover occurring between the access networks; and transmitting a resource reservation confirm message to the mobile node according to the result of the second authentication, wherein the previous communicating access network and the adjacent target access network each comprise an access network quality broker (ANQB) that manages resources of low level elements in each access network, and wherein the checking comprises checking the availability of the resources in the adjacent target access network by exchanging QoS resource information between the ANQBs, wherein the checking the availability of the resources in the adjacent target access network comprises:

transmitting, from the mobile node to the access router of the previous communicating access network, an event object message having mobility information and a request to check the availability of the resources in the target access network;

transmitting a resource check message (Res CHECK) to the access network quality broker (ANQB) in the previous access network from the access router of the previous communicating access network;

transmitting a resource availability check request message (Res CHECK REQ) to an ANQB of the adjacent target access network from the ANQB in the previous communicating access network; and checking the availability of the resources in the adjacent target access network by the ANQB of the adjacent target access network.

2. The method of claim 1, wherein the resource reservation message transmitted from the mobile node to the adjacent target access network comprises preemption information, and the resources in the adjacent target access network are preempted for the mobile node according to the preemption information.

3. The method of claim 1, wherein the resource reservation message transmitted from the access router of the adjacent target access network to the core network comprises preemption information, and the resources in the core network are preempted for the mobile node according to the preemption information.

4. The method of claim 1, wherein the authority of the mobile node to use the resources in the adjacent target access network is authenticated in the adjacent target access network by an access network policy entity (ANPE) that determines a policy regarding usage of the resources in the adjacent target access network.

5. The method of claim 1, wherein the authority of the mobile node to use the resources in the core network is checked in the core network by a core network quality broker (CNQB) that manages resources of low level elements in the core network.

6. The method of claim 1, wherein the authority of the mobile node to use the resources in the core network is authenticated by a core network polity entity (CNPE) that determines a policy regarding usage of the resources in the core network.

7. The method of claim 1, wherein the resource reservation message comprises a flag field representing a destination of the resource reservation message.

8. The method of claim 7, wherein the flag field is a cross-over node (CRN) flag field indicating that the destination of the message is a CRN of the IP-based network.

9. The method of claim 7, wherein the flag field comprises one bit.

10. The method of claim 1, the availability of the resources in the adjacent target access network is checked through communication of access network quality brokers (ANQBs) of the previous communicating access network and the adjacent target access network which manage resources of low level elements in the access networks.

11. The method of claim 1, further comprising:

transmitting a resource availability check request message (Res_CHECK_REQ) to a core network quality broker (CNQB) in the IP-based network from the ANQB of the adjacent target access network after the checking of the availability of the resources in the adjacent target access network by the ANQB of the adjacent target access network;

transmitting a resource response message (Res_Availability_REP) having information representing whether the resources in the core network are available according to the checking of the availability from the CNQB to the ANQB of the adjacent target access network; and transmitting the resource availability response message (Res_Availability_REP) to the ANQB of the previous communicating access network from the ANQB of the adjacent target access network.

12. The method of claim 1, further comprising:

transmitting the response availability response message (Res_Availability_REP) to the access router of the previous communicating access network by the ANQB of the previous communicating access network in response to the ANQB of the previous communicating access network receiving the message; and transmitting a resource confirm message to the mobile node from the access router of the previous communicating access network.

13. The method of claim 1, wherein the authority of the mobile node to use the resources in the adjacent target access network is checked in the adjacent target access network by the ANQB.

14. The method of claim 1, further comprising:

performing a session binding update in an edge router accessing the previous communicating access network before the handover from the IP-based core network after the transmitting of the resource reservation confirm message to the mobile node according to the result of the second authentication; and initiating resource release at the edge router to release resources of the previous communicating access network before the handover.

15. A method of signaling quality of service information in response to a handover from a first access network to a second access network in an Internet Protocol (IP) based mobile network environment, the method comprising:

checking an availability of the resources in the second access network, at a mobile node;

transmitting a resource reservation message from the mobile node to the second access network;

transmitting the resource reservation message to an IP-based core network from the second access network; and transmitting a resource reservation confirm message to the mobile node, wherein the first access network and the second access network each comprise an access network quality broker (ANQB) that manages resources of low level elements in each access network, and wherein the checking comprises checking the availability of the resources in the second access network by exchanging QoS resource information between the ANQBs, wherein the checking the availability of the resources in the second access network comprises:

transmitting, from the mobile node to the access router of the first access network, an event object message having mobility information and a request to check the availability of the resources in the target access network;

transmitting a resource check message (Res CHECK) to the access network quality broker (ANQB) in the first access network from the access router of the first access network;

transmitting a resource availability check request message (Res CHECK REQ) to an ANQB of the second access network from the ANQB in the first access network; and checking the availability of the resources in the second access network by the ANQB of the second access network.

16. The method of claim 15, further comprising checking an authority of the mobile node to use the resources in the second access network.

17. The method of claim 16, wherein the authority of the mobile node to use the resources in the second access network is checked by the ANQB.

18. The method of claim 15, further comprising checking an authority of the mobile node to use resources in the core network.

19. The method of claim 18, wherein the authority of the mobile node to use the resources in the core network is checked by a core network quality broker that manages resources of low level elements in the core network.

20. The method of claim 15, wherein the resource reservation confirm message comprises preemption information, and resources in the second access network are preempted for the mobile node according to the preemption information.

21. The method of claim 15, wherein the resource reservation confirm message comprises preemption information, and resources in the core network are preempted for the mobile node according to the preemption information.

* * * * *

UNITED STATES PATENT AND TRADEMARK OFFICE
CERTIFICATE OF CORRECTION

| | | |
|---|---|---|
| PATENT NO. | : 7,680,079 B2 | Page 1 of 1 |
| APPLICATION NO. | : 11/265108 | |
| DATED | : March 16, 2010 | |
| INVENTOR(S) | : Seong-ho Jeong et al. | |

It is certified that error appears in the above-identified patent and that said Letters Patent is hereby corrected as shown below:

Column 14, Line 22, after "claim 1," insert --wherein--.

Signed and Sealed this

Fifteenth Day of June, 2010

David J. Kappos
*Director of the United States Patent and Trademark Office*